Oct. 27, 1964 J. PHILLIPS ETAL 3,153,827
BELT FASTENERS
Filed Nov. 17, 1961

Inventors
John Phillips
Guido Castro
Ferenc Szemes

By Stevens, Davis, Miller & Mosher
Attorneys

United States Patent Office 3,153,827
Patented Oct. 27, 1964

3,153,827
BELT FASTENERS
John Phillips, Hayes, Guido Castro, London, and Ferenc Szemes, Hounslow, England, assignors to Coal Industry (Patents) Limited, London, England
Filed Nov. 17, 1961, Ser. No. 153,115
Claims priority, application Great Britain Nov. 22, 1960
2 Claims. (Cl. 24—33)

This invention relates to fasteners for joining two ends of a belt to form, for example, an endless belt conveyor or an endless power transmission belt. Such fasteners normally consist of two series of units, a first series being secured to one end of a belt and a second series being secured to the other end of the belt or to an end of another belt, being joined by interdigitating the units of the two series and locking them together by means of a rod-like member (rigid or otherwise) passed through the interdigitated units.

Known types of belt fasteners are usually made up by a series of pieces of wire, each piece of wire being bent in a generally V or U form usually with one wire per limb, but sometimes with more, the free ends of which are bent inwards and pointed. Such wire hook fasteners are secured to each belt end by forcing the pointed ends through the belt until each of the two limbs lies generally parallel with the surface of the belt and then clenching and pointed ends on to the adjacent belt surface leaving the apex or trough of the V or U extending beyond the belt at its free end.

With such a construction the cross-sectional area of the wire has to be such as to provide the fastener with an adequate strength in tension and in bending (as it passes, in use, over the end rollers of a belt conveyor). While metallurgical changes can affect the pure tensile properties of the wire, it is not practicable to make any significant changes by these means in the resistance to bending. With the present-day tendency to use manmade fibres for belt reinforcement, fastenings made with the known form of fasteners have become very weak in relation to the belt, and are liable to "opening out."

It is an object of the present invention to provide a fastener which overcomes or substantially reduces this disadvantage.

The fasteners constructed according to the present invention are particularly, although not exclusively, suitable for use with high tensile synthetic fibre reinforced belting.

According to the invention, a belt fastener unit comprises a main element of generally U- or V-shaped formation having a pair of limbs adapted to accommodate between them the part of the belt to be fastened, and a securing element which engages with one or both limb(s) and which comprises one or more legs adapted to pass through the belt to secure the main element to the belt.

The securing element comprises a staple and the limbs of the main element are each provided with at least one hole through which, in use, the legs of the staple are passed to fasten the main element to the belt. The staple is substantially U-shaped having two legs each pointed at one end and connected by a bridge portion at their other ends, and, to receive the staple, two holes are then provided, in corresponding positions, in each of the limbs or straight portions of the U-shaped main part. A recess is preferably provided surrounding each pair of holes so that the bridge portion of the staple and the clenched-over pointed ends of the staple do not project, or at least project only to a limited extent, above the surface of the main element. The main element and the securing element may be of any desired cross-sectional shape; in particular the main element may be of generally circular cross-section and may then be fabricated from a wire blank. The cross-sectional shape and size of the main element may be the same throughout or may vary. In particular, the limbs may be broadened towards their free ends, in order to accommodate holes sufficient for two or more staples. The securing element preferably has a circular cross-section tapering to a point.

The securing element may be integral with the main element or the securing element may be separate therefrom. If the securing element is integral with the main element, it may comprise a leg secured to one of the limbs of the main element which, when the unit is secured thereby to a belt, passes through the belt and through an aperture in the other limb of the main element, and is clenched into a recess surrounding the aperture. If desired more than one such leg and corresponding aperture may be provided. In this case, the legs may all be on one of the limbs of the main element and the apertures all on the other of the limbs, or the legs may be some on one limb and some on the other limb and the corresponding apertures mounted some on said other limb and some on said one limb.

If the securing element is separate from the main element, it may comprise a staple, as hereinbefore described, or, alternatively, stitching by which the main element can be secured to the belt, the stitching passing through aligned apertures in the limbs of the main element.

If a staple is used, the arrangement of the legs and apertures through which the legs pass may be such that when the fastener is secured to the belt the legs of the staple are spaced one from the other longitudinally, transversely, or diagonally of the belt.

One embodiment of the invention will now be described, by way of example, with reference to the accompanying drawings in which.

Figures 1, 2:
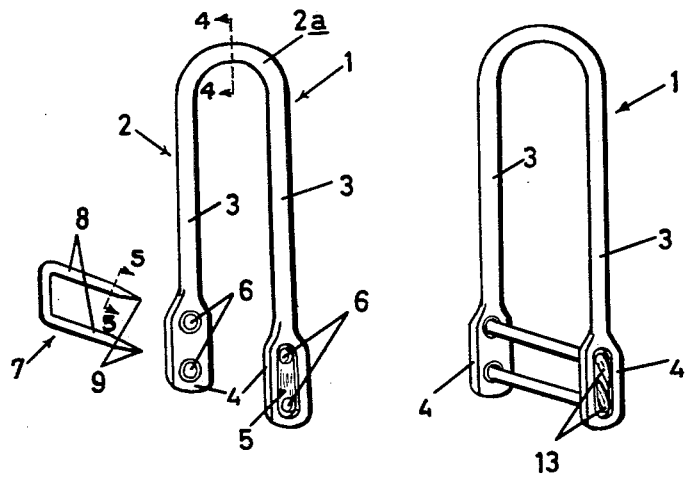
FIGURE 1 is a perspective view of an unassembled unit of a first embodiment.
FIGURE 2 is a similar view of the assembled unit.
Figure 3:
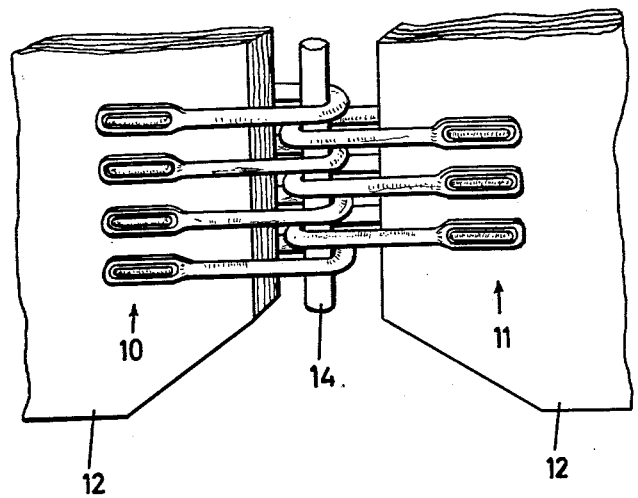
Figure 4:
Figure 5:

FIGURE 3 is a perspective view of a fastener secured to the ends of the belt, the fastener comprising two series of the units shown in FIGURES 1 and 2, FIGURE 4 is a section on an enlarged scale on the line 4—4 of FIGURE 1, FIGURE 5 is a section on the same scale on the line 5—5 of FIGURE 1.

As shown in FIGURES 1 and 2, each unit 1 comprises a wire-like main element 2 of generally circular cross-section and a securing element 7. The element 2 is of U-shape and has a pair of limbs 3 each of which adjacent its free end has an enlarged portion 4 which is recessed at 5 and is provided in its recess with a pair of apertures 6 (FIGURE 1) spaced longitudinally of their respective limb.

Also provided is a securing element constituted by a staple 7 having the free ends of its legs 8 pointed at 9. The cross-sectional area of one of the legs 8 of the staple is smaller than, and preferably from ¼ to ⅔ of, the cross-sectional area of the bent portion 2a of the main element 2 (FIGURES 4 and 5).

The fastener (as can be seen in FIGURE 3) comprises two series 10 and 11 of units 1 which are assembled one on each end of the belt 12 by passing the respective end of the belt between the limbs 3 of the main element 2 of each unit, pressing the legs 8 of the staple 7 through the apertures 6 in the main element 2 and through the belt 12, and bending over the projecting portion of the legs 8 of the staple 7 (as at 13 in FIGURE 2).

The ends of the belt 12 are secured together in the usual manner by interdigitating the assembled units 1 of the series 10 on the end of the belt with the units of the series 11 on the other end of the belt and passing through the interdigitated units a locking rod-like member 14.

If desired, the units 1 of each series may be interconnected in the known manner for ease of attachment to a belt by mounting in a paper or other temporary frame or holding together by spot welding on a wire or any other simple or convenient means.

If desired, the staple 7 as such as can be replaced by a single-leg staple similar to a pin, or it can be dispensed with and the legs 8 secured to or formed integral with the limbs 3 of the main element 2. In such a case, the legs 8 may both be mounted on one limb 3, the other limb 3 then being provided as shown with end apertures 6, or the legs 8 may be mounted on one each limb 3, each limb 3 then being provided with one aperture aligned with the leg 8 on the other limb.

In an optional alternative arrangement of units 1 to form a belt fastener, the units 1 may be spaced across the belt and each provided with one or more holes 6, and each staple 7 may be common to two adjacent units 1, i.e. one of the legs 8 is passed through a hole 6 in one unit such as 1 and the other of the legs 8 is passed through a hole in an adjacent unit. It will be appreciated that the units may be at any convenient regular or irregular spacing across the belt, according to the type of belt joint required and the mechanical conditions in which the belt is to be used. Furthermore, if desired, the leg or legs of the staple may be passed obliquely through the belt rather than perpendicularly to its surface, although at the pesent time the latter is preferred since the fixing of each fastener unit to the belt is then a simpler operation.

We claim:

1. A conveyor belt fastener unit comprising a main element and a securing element, the main element being of wire-like form and comprising two substantially parallel similar limbs integral with and joined by a connecting portion, the limbs having a regular cross-sectional shape for the major part of their length and the connecting portion having a cross-sectional shape and size substantially identical to that of the major portion of the limbs, said limbs being adapted to accommodate between them a part of one of the ends of the belt to be joined and said limbs having walls defining in each limb at least one pair of apertures, the apertures being spaced longitudinally of the limb and located towards the end of the limb remote from the connecting portion, and the securing element comprising two substantially parallel similar legs integral with and joined by a bridge portion, the legs being pointed at their ends remote from the bridge portion and being so spaced apart that the legs can be passed through said one pair of apertures in each limb to secure the main element to the belt, the ratio of the cross-sectional area of the connecting portion of the main element to the cross-sectional area of each leg of the securing element lying between 4:1 and 1.5:1.

2. A belt connector assembly comprising two series of identical fastener units, a first series being adapted to be secured to one end of the belt and a second series adapted to be secured to the other end of the belt, the units of the two series being interdigitated and locked together by means of a rod passing through the interdigitated unit, each unit comprising a main element and a securing element, the main element being of wire-like form and comprising two substantially parallel similar limbs integral with and joined by a connecting portions, the limbs having a regular cross-sectional shape for the major part of their length and the connecting portion having a cross-sectional shape and size substantially identical to that of the major portion of the limbs, said limbs being adapted to accommodate between them a part of one of the ends of the belt to be joined and said limbs having walls defining in each limb at least one pair of apertures, the apertures being spaced longitudinally of the limb and located towards the end of the limb remote from the connecting portion, and the securing element comprising two substantially parallel similar legs integral with and joined by a bridge portion, the legs being pointed at their ends remote from the bridge portion and being so spaced apart that the legs can be passed through said one pair of apertures in each limb to secure the main element to the belt, the ratio of the cross-sectional area of the connecting portion of the main element to the cross-sectional area of each leg of the securing element lying between 4:1 and 1.5:1.

References Cited in the file of this patent

UNITED STATES PATENTS

| | | |
|---|---|---|
| 2,170,973 | Olsen | Aug. 29, 1939 |
| 2,444,007 | Davis | June 2, 1948 |
| 2,454,224 | Shook | Nov. 16, 1948 |
| 2,477,855 | Beach | Aug. 2, 1949 |
| 2,490,195 | Beach | Dec. 6, 1949 |
| 2,516,779 | Lesesne | July 25, 1950 |
| 2,893,007 | De Windt | July 7, 1959 |
| 2,935,774 | Schick | May 10, 1960 |

FOREIGN PATENTS

| | | |
|---|---|---|
| 865,194 | France | Feb. 17, 1941 |
| 1,185,742 | France | Feb. 16, 1959 |
| 730,224 | Germany | Jan. 8, 1943 |
| 612,565 | Great Britain | Nov. 15, 1948 |